A. G. SLOCUM.
WHEELWRIGHT APPARATUS.
APPLICATION FILED APR. 4, 1914.
1,108,803.
Patented Aug. 25, 1914.
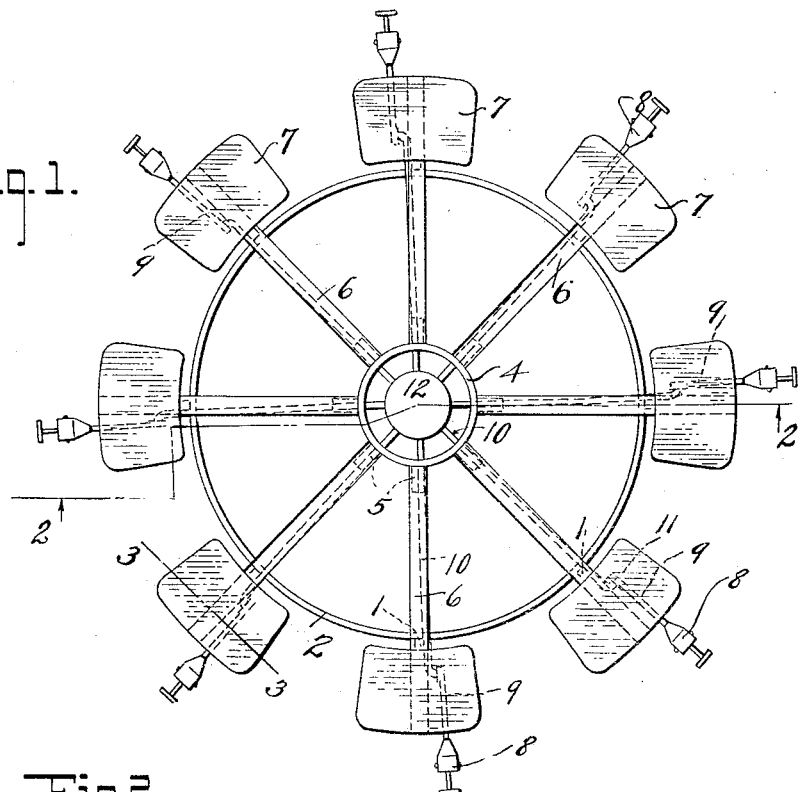
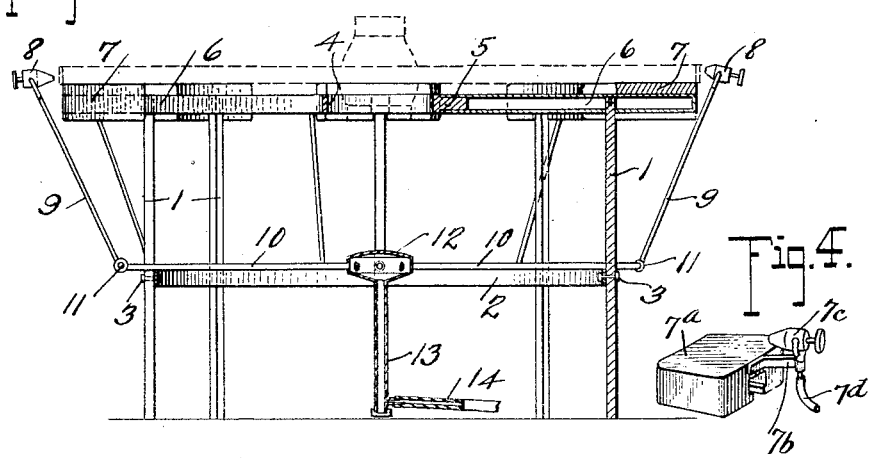
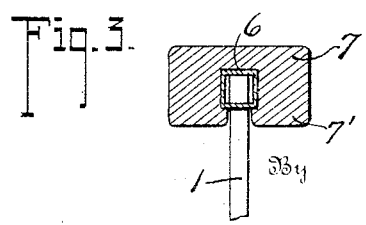
Witnesses
C. H. Wagner
L. Compton
Inventor
A. G. Slocum
By Robt S Robb
Attorneys
THE NORRIS PETERS CO., PHOTO-LITHO., WASHINGTON, D. C.

UNITED STATES PATENT OFFICE.

ARTHUR G. SLOCUM, OF ENSIGN, KANSAS.

WHEELWRIGHT APPARATUS.

1,108,803.  Specification of Letters Patent.  Patented Aug. 25, 1914.

Application filed April 4, 1914. Serial No. 829,459.

*To all whom it may concern:*

Be it known that I, ARTHUR G. SLOCUM, a citizen of the United States, residing at Ensign, in the county of Gray and State of Kansas, have invented certain new and useful Improvements in Wheelwright Apparatus, of which the following is a specification.

This invention relates to improvements in wheelwright apparatus and particularly to that type designed for the purpose of heating tires of wheels to effect their removal from or application to the vehicle wheel as well as to enable cutting and adjusting of said tires.

The primary object in view is to provide a device of this character by means of which the heating operation may be considerably facilitated and embodying a suitable supporting frame upon which the vehicle wheel may be disposed when the tire is to be operated upon, said frame having adjustable rests to receive the felly susceptible of being adjusted for varying sizes of wheels, and heating instrumentalities for supplying heat to the tire.

A further object lies in the provision of heating means for directing heat against the tire and so arranged as to be readily movable toward or from the tire when it is disposed upon the supporting frame and adjustable rests hereinbefore mentioned.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a plan view of an apparatus constructed in accordance with my invention. Fig. 2 is a transverse sectional view taken about on the line 2—2 of Fig. 1; and Fig. 3 is a sectional view on the line 3—3 of Fig. 1, showing more clearly the arrangement of one of the adjustable rests on the frame. Fig. 4 is a perspective view of a slightly modified arrangement of my invention in which the burner member is connected to the adjustable rest directly.

Specifically describing this invention and referring to the drawing, I provide a suitable supporting frame of any desired shape, and construction, but preferably consisting of a plurality of legs 1 arranged circularly and connected by a band 2 secured to said legs at any desired point in their height by means of fastening members 3. Disposed centrally of the frame is a hub supporting spider 4 of ring-like form and provided with a plurality of lugs or projections 5, as most clearly seen in Fig. 2 of the drawing, on to which projections the inner extremities of a plurality of radiating arms 6 are mounted. As illustrated these arms 6 are preferably of hollow tubing though it will be apparent that they may consist of bars which are square in cross section, and these arms are disposed upon the upper extremities of the legs 1 to which each is fastened by any suitable fastening means. A rigid supporting frame is thus provided and a wheel which is to be operated upon is disposed upon the frame after a manner shown in dotted lines in Fig. 2. In order to accommodate different sizes of wheels as well as to provide a firm support for the wheel felly, each of the radiating arms 6 has slidably mounted thereon an adjustable rest 7 in the form of a plate. These rests as most clearly shown in Fig. 3 are formed with spaced guide flanges 7' therebeneath so as to guide the plates in their sliding movement on the arms 6 radially with respect to the supporting frame. The arms 6 extend preferably beyond the legs 1 a suitable distance and the spacing of the flanges 7' of each of the plates 7 permits said plates to pass the legs when adjusted inwardly and outwardly on the arms.

When the felly of the wheel is disposed upon the plates 7 with the tire of the wheel projecting slightly beyond said plates the removal of said tire from the felly may easily be accomplished by hammering or manipulation in the usual manner. To facilitate this removal or application of a tire to the wheel, I provide heating instrumentalities in the form of burners 8 which are carried on the upper extremities of a suitable number of arms 9 which arms consist of hollow tubing so as to constitute conduits for supplying fuel to the burners. Each of the arms or conduits 9 are connected to the radiating conduits 10 by a flexible or pivot joint 11 which permits movement of the arms 9 whereby to adjust the burners toward or from the periphery of the wheel when disposed upon the supporting frame. This joint frictionally holds the burner arms 9 at adjusted positions. The conduits 10 rest upon the annular band or ring 2 and connect with a central distributer 12 which distributer is in turn connected to a suitable source of fuel such as hydrocarbon through the conduits 13 and 14. It will be obvious that the use of a plurality of these burners all simultaneously supplied with a heating fuel facilitate the heating of the tire to a very decided extent having in view the fact that the heat is supplied at a large number of points in its circumference. When the tire has become heated and expanded by the heating instrumentalities its removal from the wheel becomes an easy matter or the application of the tire to the wheel is also facilitated when desired by heating the tire alone after its disposition upon the adjustable rests 7.

The apparatus becomes useful for a variety of operations in the wheelwright art and within the purview of this invention.

It will be apparent that any suitable number of heating instrumentalities as well as adjustable rest members may be provided in this apparatus and I do not wish to be confined to the details of structure in this respect.

In Fig. 4 I have illustrated a slightly modified form of burner arrangement wherein the rest 7ᵃ is provided with an outwardly extending bracket 7ᵇ which supports the burner 7ᶜ and to this burner is connected a flexible supply pipe 7ᵈ leading from the source of fuel supply. In this construction, movement of the rest 7ᵃ on its supporting bar will adjust the burner toward or from the object to be heated, the flexible pipe 7ᵈ permitting of such movement in an obvious manner.

Having thus described my invention, what I claim as new is:

1. In wheelwright apparatus of the class described, the combination of a frame comprising supporting legs and horizontally disposed radiating arms supported by said legs, an adjustable rest carried by each arm and freely movable therealong, and heating instrumentalities associated with said rests and pivotally carried by the frame to swing independently of the rests.

2. In wheelwright apparatus of the class described, the combination of a frame comprising supporting legs, a brace member connected to said legs, horizontally disposed arms arranged radially, each leg having connection with an arm intermediate its length whereby said arm extends beyond the leg, a rest member slidably mounted on each arm and formed with spaced connecting elements for its arm whereby to permit movement of the rests therealong and past its supporting leg, burners associated with the rests, and supply conduits for said burners each comprising a relatively stationary portion supported upon the leg brace and a movable portion extending therefrom carrying a burner for independent adjustment of said burner with respect to the rest.

In testimony whereof I affix my signature in presence of two witnesses.

ARTHUR G. SLOCUM.

Witnesses:
JAY DAWSON,
GEO. W. SLOCUM.